(12) United States Patent
Shveidel et al.

(10) Patent No.: US 11,163,602 B2
(45) Date of Patent: Nov. 2, 2021

(54) MIGRATION FROM AN ASYNCHRONOUS EXECUTION MODEL TO A SYNCHRONOUS EXECUTION MODEL

(71) Applicant: EMC IP HOLDING COMPANY LLC, Hopkinton, MA (US)

(72) Inventors: Vladimir Shveidel, Pardes-Hana (IL); Ronen Gazit, Tel Aviv (IL); Bar David, Rishon Lezion (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 130 days.

(21) Appl. No.: 16/657,050

(22) Filed: Oct. 18, 2019

(65) Prior Publication Data

US 2021/0117227 A1  Apr. 22, 2021

(51) Int. Cl.
*G06F 9/46*  (2006.01)
*G06F 9/48*  (2006.01)

(52) U.S. Cl.
CPC .................. *G06F 9/485* (2013.01)

(58) Field of Classification Search
CPC ........................................ G06F 9/485
See application file for complete search history.

(56) References Cited

U.S. PATENT DOCUMENTS

| | | | | |
|---|---|---|---|---|
| 7,950,025 B1* | 5/2011 | McCann | ............ | G06F 9/545 719/328 |
| 8,954,968 B1* | 2/2015 | Pohl | ............ | G06F 11/3404 718/100 |
| 2013/0262898 A1* | 10/2013 | Preston | ............ | G06F 11/1417 713/323 |
| 2020/0186579 A1* | 6/2020 | Adams | ............ | H04L 67/42 |

* cited by examiner

*Primary Examiner* — Camquy Truong
(74) *Attorney, Agent, or Firm* — Daly, Crowley, Mofford & Durkee, LLP

(57) ABSTRACT

A method is provided comprising: initializing a first thread based on a first work request; and executing the first thread to complete the first work request, wherein the first thread is initialized and executed by using an Application Programming Interface (API) that is arranged to emulate a work request queue by initializing a different respective thread for each work request that is submitted to the API for addition to the work request queue.

12 Claims, 6 Drawing Sheets

MIGRATION FROM AN ASYNCHRONOUS EXECUTION MODEL TO A SYNCHRONOUS EXECUTION MODEL

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: initializing a first thread based on a first work request; and executing the first thread to complete the first work request, wherein the first thread is initialized and executed by using an Application Programming Interface (API) that is arranged to emulate a work request queue by initializing a different respective thread for each work request that is submitted to the API for addition to the work request queue.

According to aspects of the disclosure, a system is provided, comprising: a memory; and at least one processor operatively coupled to the memory, the at least one processor being configured to perform the operations of: initializing a first thread based on a first work request; and executing the first thread to complete the first work request, wherein the first thread is initialized and executed by using an Application Programming Interface (API) that is arranged to emulate a work request queue by initializing a different respective thread for each work request that is submitted to the API for addition to the work request queue.

According to aspects of the disclosure, a non-transitory computer-readable medium is provided that stores processor-executable instructions, which when executed by at least one processor cause the at least one processor to perform the operations of: initializing a first thread based on a first work request; and executing the first thread to complete the first work request, wherein the first thread is initialized and executed by using an Application Programming Interface (API) that is arranged to emulate a work request queue by initializing a different respective thread for each work request that is submitted to the API for addition to the work request queue.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1A:
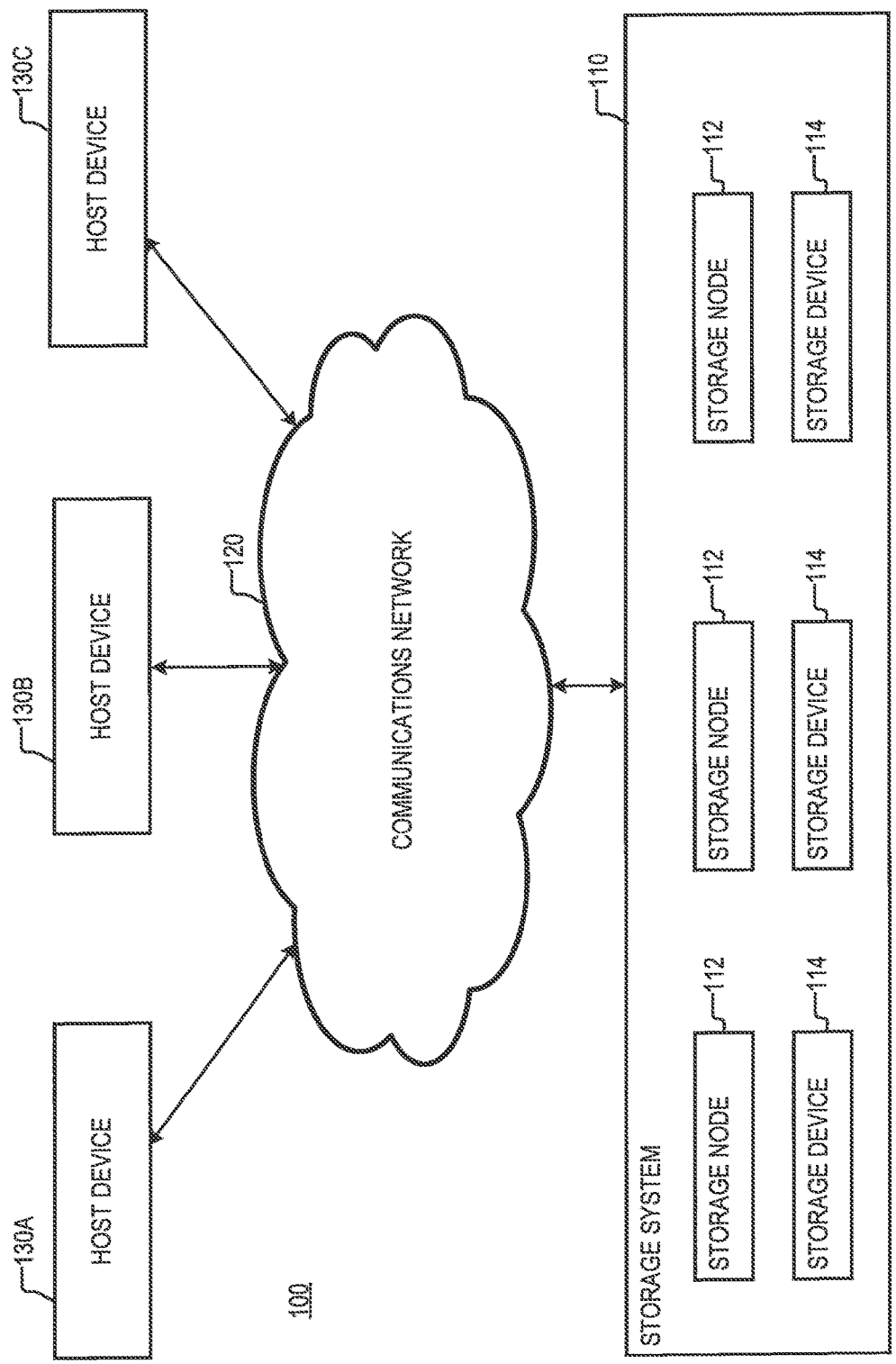
FIG. 1A is a diagram of an example of a storage system, according to aspects of the disclosure.

FIG. 1A is a diagram of an example of a system 100, according to aspects of the disclosure. The system 100 may include a storage system 110 that is coupled to one or more host devices 130 via a communications network 120. The storage system 110 may include a midrange storage system, an enterprise storage system, and/or any other suitable type of storage system. The storage system 110 may include a plurality of storage nodes 112 and storage devices 114. Each of the storage devices may include a solid-state drive (SSD), a hard disk, a non-volatile memory device, and/or any other suitable type of storage devices. In operation, the storage nodes 112 may retrieve and store data into the storage devices 114 in response to I/O requests that are received at the storage system 110 from the host devices 130. The communications network 120 may include a local area network (LAN), a wide area network (WAN), the Internet, and/or any or suitable type of communications network. Each of the host devices 130 may include a desktop computer, a laptop computer, a smartphone, a digital media player, and/or any other suitable type of electronic device.

Figure 1B:
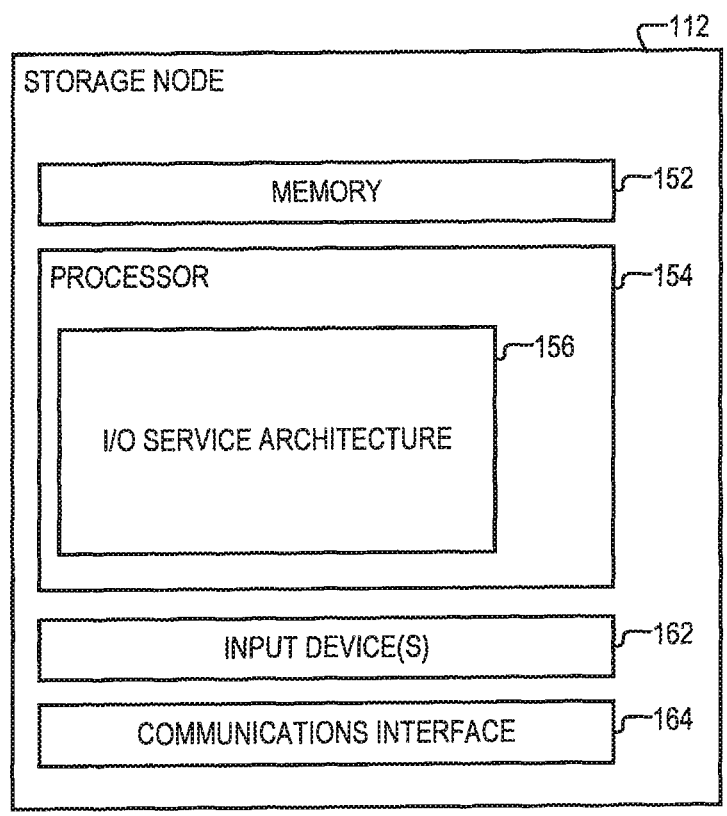
FIG. 1B is a diagram of an example of a computing device that is part of the storage system of FIG. 1A, according to aspects of the disclosure.

FIG. 1B is a diagram of an example of a storage node 112, according to aspects of the disclosure. The storage node 112 may include a memory 152, a processor 154, input/output (I/O) device(s) 162, and communications interface(s) 164. The memory 152 may include any suitable type of volatile or non-volatile memory. For example, in some implementations, the memory 152 may include a random-access memory (RAM), a flash memory, a solid-state drive (SSD), a hard disk (HD) and/or any other suitable type of memory. The processor 154 may include any suitable type of processing circuitry. For example, in some implementations, the processor 154 may include one or more of a general-purpose processor (e.g., an x86 processor, a RISC processor, etc.), an application-specific integrated circuit (ASIC), and a field-programmable gate array (FPGA). The I/O device(s) 162 may include one or more of a display, a speaker, a microphone, a keyboard, a printer, and/or any other suitable type of I/O device. The communications interface(s) 164 may include one or more of a Bluetooth interface, an Ethernet interface, an Infiniband interface, a WiFi interface, and/or any other suitable type of interface.

In some implementations, the processor 154 may be configured to execute an I/O service architecture. In some implementations, the I/O service architecture 156 may include one or more processor-executable instructions, which, when executed by the processor 154, cause the processor 154 to complete one or more work requests. In some implementations, the I/O service architecture 156 may be the same or similar to the I/O service architecture 200, which is described further below with respect to FIG. 2. Additionally or alternatively, in some implementations, the I/O service architecture 156 may be the same or similar to the I/O service architecture 300, which is discussed further below with respect to FIG. 3.

As used throughout the disclosure, the term "work request" may be an instruction or command to perform a task (e.g., an atom of work). The task may be related to data retrieval, data storage, garbage collection, destaging, front-end input/output and/or any other suitable operation. In some implementations, a work request may be generated within the storage system 110 based on an I/O request (e.g., a data read request, a data write request, etc.) that is received from one of the host devices 130. Additionally or alternatively, in some implementations, a work request may be generated internally within the storage system 110. As used throughout the disclosure, the term "work request" may also refer to an object that is used to perform a task (i.e., an object that is used to execute a work request). For instance, in some implementations, such an object may include one or more processor executable instructions, which when executed by at least one processor, cause the at least one processor to perform a task.

Figure 2:
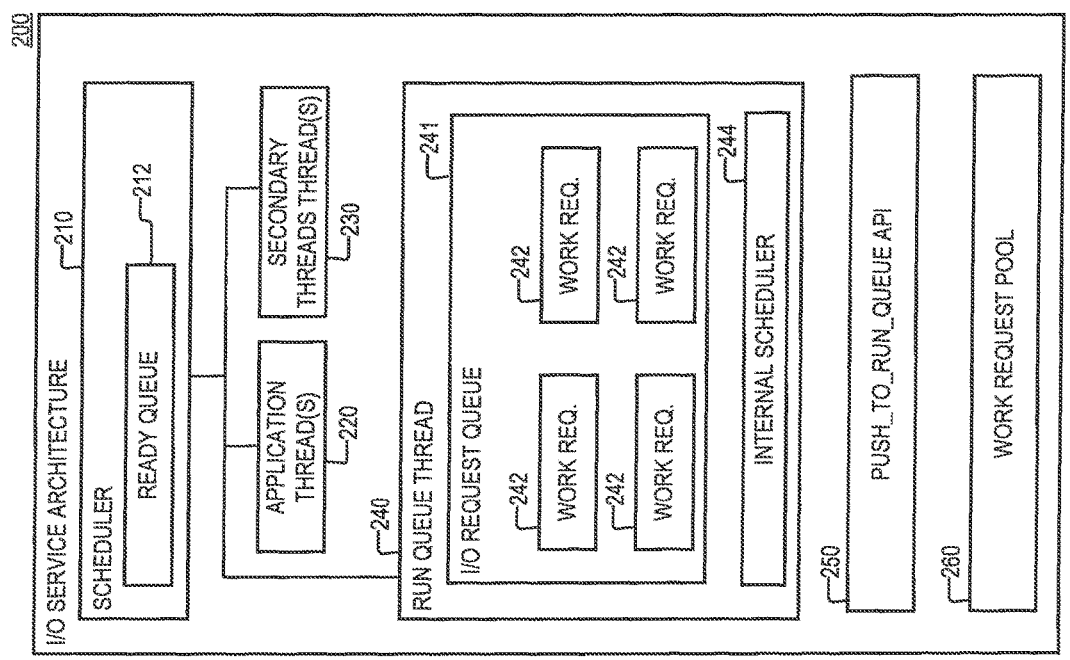
FIG. 2 is a diagram of an I/O service architecture, according to the prior art.

FIG. 2 depicts a diagram of an I/O service architecture 200, according to the prior art. As illustrated, the architecture 200 may include a scheduler 210, one or more application threads 220, one or more secondary threads 230, a run queue thread 240, an Application Programming Interface (API) 250, and a work request pool 260.

The scheduler 210 may be configured to use a READY queue 212 to synchronize the execution of the application threads 220, the secondary threads 230, and the run queue thread 240. When any of the application threads 220, the secondary threads 230, and run queue thread 240 is ready for execution, that thread may be placed in the READY queue 212 in a well-known fashion. After a thread is placed in the READY queue 212, the scheduler 210 may dequeue that thread from the READY queue 212 and allocate the processor 154 to it. According to the present disclosure, the scheduler 210 may include any thread scheduler that is known in the art.

Each of the application threads 220 may include a thread that is configured to initiate work requests 242, resume work requests 242, and/or perform any other suitable function. According to the present example, each of the secondary threads 230 may include a poker thread that is configured to interact with the hardware of one or more storage devices, and generate events when reads or writes that are being performed on the storage devices have completed. The run queue thread 240 may implement a work request queue 241. The API 250 may implement a PUSH_TO_RUN_QUEUE function, which provides an interface for adding requests 242 to the work request queue 241. The internal scheduler 244 may be executed within the run queue thread 240, and it may be configured to synchronize the execution of the work requests 242 that are present in the work request queue 241. Although, in the present example, each of the secondary threads 230 is a puller thread, it will be understood that alternative implementations are possible in which any of the secondary threads 230 is another type of thread. Stated succinctly, the present disclosure is not limited to any specific implementation of the secondary threads 230.

The architecture 200 provides a mechanism by which the work requests 242 are initiated or resumed. When a given work request 242 is desired to be executed, any of the application threads 220 may retrieve the given work request 242 from the work request pool 260 and add it to the work request queue 241 by calling a PUSH_TO_RUN_QUEUE function. Once the given work request is placed on the work request queue 241, the execution of the work request 242 may be commenced by the internal scheduler 244. As the given work request is being executed, a read or a write command may be placed with a storage device (e.g., an SSD, an HD, etc.). After the command is placed with the storage device, the given work request 242 may be suspended and removed from the work request queue 241.

After the given work request 242 is removed from the work request queue 241, any of the secondary threads 230 may poll the storage device to detect whether the command is completed. In response to detecting that the command is completed, the secondary thread 230 may generate an event indicating that the command has been completed. When the event is detected by any of the application threads 220, the given work request 242 may be resumed by that application thread 220. More specifically, the application thread 220 may resume the given work request 242 by adding the given work request 242 back to the work request queue 241. To add the request to the given work request 242 back to the work request queue 241, the application thread 220 may call the PUSH_TO_RUN_QUEUE function of API 250. After the request 242 has returned to the work request queue 241, the request 242 may again be selected and executed in a well-known fashion by the internal scheduler 244.

Stated succinctly, in the architecture 200, the work requests are initiated or resumed by calling to PUSH_TO_RUN_QUEUE function of API 250. Furthermore, in the architecture 200, all work requests 242 are executed within the same thread (i.e., the run queue thread 240), and the execution of the work requests 242 that are present in the work request queue 241 is synchronized by the internal scheduler 244. This arrangement is herein referred to as a "run-queue-based" architecture.

Run-queue-based architectures can be contrasted with what is herein referred to as "thread-based" architectures. In thread-based architectures, work requests are executed in different threads, and a context switch needs to be performed when the execution of one work request needs to be suspended while the execution of another work request is resumed. An advantage of run-queue-based architectures over thread-based architectures is that they avoid expensive context switching. However, with the advent of lightweight threads, this advantage has faded. On the other hand, thread-based architectures are advantageous over run-queue-based architectures because they provide simplified controls of up-to-yield time and smoother scheduling of individual work requests. In some respects, run-queue-based architectures may be implemented by using an asynchronous programming model, which relies on callbacks to switch between the execution of different work requests. By contrast, thread-based architectures can be implemented by using a synchronous programming model in which each work request is processed as a separate thread. Because each work request is processed as a separate thread, the switching between different work requests in the thread-based model may be performed by using well-understood (and common) synchronization patterns, such as locks, barriers, and semaphores, for example.

One challenge of migrating a storage system from the run-queue-based model to the thread-based model is that the migration would require re-writing all system modules that are configured to interact with a work request queue for the initiation and resumption of work requests. For instance, in the example of FIG. 2, migrating away from the architecture 200 would require re-writing all system (or software modules) that rely on calls to the PUSH_TO_RUN_QUEUE function of API 250 to initiate or resume the execution of the work requests 242.

Figure 3:
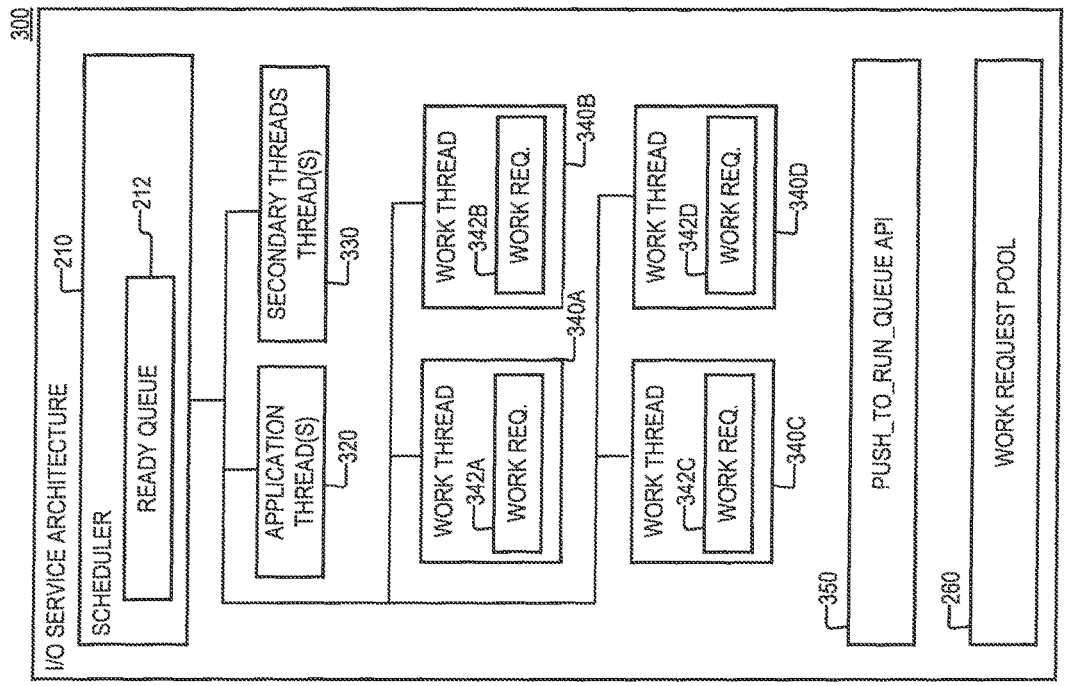
FIG. 3 is a diagram of an I/O service architecture, according to aspects of the disclosure.

FIG. 3 depicts an example of an improved I/O architecture 300, which can be easily migrated to from the architecture 200. According to the present example, the I/O architecture 300 is a thread-based architecture which does not require a re-design of at least some legacy system components that are configured to interact with the work request queue of a run-queue-based architecture for executing work requests. As illustrated, the architecture 300 may also include a scheduler 210, one or more application threads 320, one or more secondary threads 330, one or more work threads 340, an API 350, and a work request pool 260.

Each of the application threads 320 may include a thread that is configured to initiate work requests 342, resume work requests 342, and/or perform any other suitable function. According to the present example, each of the secondary threads 330 includes a poller thread that is configured to interact with the hardware of one or more storage devices (e.g., SSDs, HDs, etc.) and generate events when reads or writes that are being performed on the storage devices have completed. Each of the threads 340 may be a thread that is configured to execute a respective work request 342. In particular, the thread 340A is configured to execute the work request 342A; the thread 340B is configured to execute the work request 342B; the thread 340C is configured to execute the work request 342C; and the thread 340D is configured to execute the work request 342D. The composition of any of the threads 340 is discussed further below with respect to FIGS. 4-5. Although, in the present example, each of the secondary threads 330 is a poller thread, it will be understood that alternative implementations are possible in which any of the secondary threads 330 is another type of thread. Stated succinctly, the present disclosure is not limited to any specific implementation of the secondary threads 330.

The API 350 may be configured to emulate a work request queue, such as the work request queue 241. More particularly, API 350 may implement a PUSH_TO_RUN_QUEUE function. In some implementations, the PUSH_TO_RUN_QUEUE function of API 350 may have the same interface as the PUSH_TO_RUN_QUEUE function of API 250, which may effectively cause API 350 to emulate the work request queue 241. Calling the PUSH_TO_RUN_QUEUE function of API 350 on a particular work request 342 may result in a thread 340 being initialized to include that work request 342, rather than the work request 342 being added to a work request queue (which is what would happen if API 250 were to be used). However, because the PUSH_TO_RUN_QUEUE function of API 350 has the same interface as the PUSH_TO_RUN_QUEUE function of API 250, this difference in operation may remain hidden from various system components that are configured to interact with API 250. This, in turn, would allow at least some system components (application threads, etc.) that are configured to interact with API 250 (in run-queue-based architecture 200) to be migrated to thread-based architecture 300 without any major redesign.

The architecture 300 provides a mechanism by which work requests 342 are initiated or resumed. When a given work request 342 is desired to be executed, any of the application threads 320 may retrieve the given work request 342 from the work request pool 260 and call the PUSH_TO_RUN_QUEUE function of API 350. Call the PUSH_TO_RUN_QUEUE function of API 350 may result in: (i) the initialization of the respective thread 340 that includes the given work request 342, and (ii) the addition of the initialized thread to the READY queue 212 of the scheduler 210. Once the respective thread 340 is placed in the READY queue 212, the execution of the given work request 342 may be commenced by the scheduler 210. Specifically, the scheduler 210 may directly commence the execution of the given work request 342 by allocating the processor 154 to the respective thread 340. As the given work request is being executed, a read or a write command may be placed with a storage device. After the command is placed with the storage device, the respective thread 340 may be suspended and removed from the READY queue 212.

After the respective thread 340 is removed from the READY queue 212, any of the secondary threads 330 may poll the storage device to detect whether the command is completed. In response to detecting that the command is completed, the secondary thread 330 may generate an event indicating that the command has been completed. When the event is detected by any of the application threads 320, the given work request 342 may be resumed by that application thread 320. More specifically, the application thread 320 may resume the work request by adding the respective thread 340 back to the READY queue 212 To add the respective thread 340 back to the READY queue 212, the application thread 320 may again call the PUSH_TO_RUN_QUEUE function of API 350. After the respective thread 350 has returned to the READY queue 212, the given work request 342 (which is contained in the respective thread 340) may again be selected and executed in a well-known fashion by the scheduler 210.

According to the present example, the architecture 200 and the architecture 300 use the same type of scheduler (i.e., the scheduler 210). However, alternative implementations are possible in which the architectures 200 and 300 use different schedulers. According to the present example, the architecture 200 and the architecture 300 use the same type of work request pool (i.e., the work request pool 260). However, alternative implementations are possible in which the architectures 200 and 300 use different types of work request pools. According to the present example, each of the work requests 342 is different from the work requests 242. However, alternative implementations are possible, in which any of the work requests 342 is the same as one of the work requests 242. According to the present example, each of the application threads 320 is different from the application threads 220. However, alternative implementations are possible, in which any of the application threads 320 is the same as one of the application threads 220. According to the present example, each of the secondary threads 330 is different from the secondary threads 230. However, alternative implementations are possible, in which any of the secondary threads 330 is the same as one of the secondary threads 230.

Figure 4:
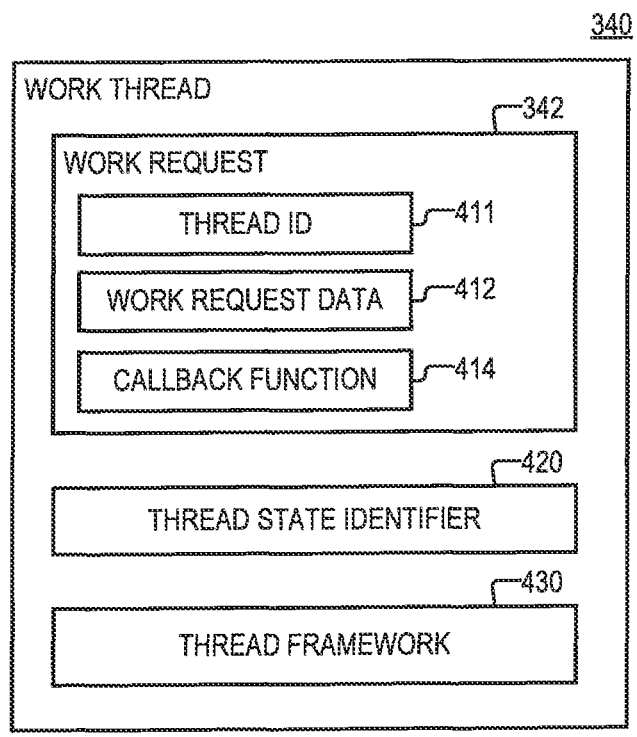
FIG. 4 is a diagram of an example of a thread for executing work requests, according to aspects of the disclosure.

FIG. 4 shows an example of the thread 340A in further detail. The thread 340A may be configured to encapsulate a work request 342A, and it may include a state identifier 420 and a thread framework 430. Furthermore, the work request 342A may include a thread identifier 411 request data 412, and a callback function 414, as shown. Although the example of FIG. 4 is presented with respect to the thread 340A, it will be understood that any of the remaining threads 340 may have the same or similar structure as the thread 340A. Although the example of FIG. 4 is presented with respect to the work request 342A, it will be understood that any of the remaining work requests 342 may have the same or similar structure as the work request 342A.

The thread identifier 411 of the work request 342A may include any suitable number, string, or alphanumerical string that is configured to identify the thread encapsulating the work request 342A (e.g., the thread 340A). Before the work request 342A is assigned to a thread, the thread identifier may be equal to NULL. Although, in the present example, the thread identifier 411 of the work request 342A is provided within the work request 342, alternative implementations are possible in which the thread identifier 411 is provided externally. In such implementations, a separate data structure (stored in memory 152) may be used, identifies different work request identifiers to respective thread identifiers.

The request data 412 may include any suitable information associated with the work request 342A, such as a type identifier, a storage device identifier, or an address in the storage device. The type identifier may indicate whether the work request 342 is a request for the retrieval of data from a storage device, a request for storage of data into the storage device, and/or another type of work request. The storage device identifier may identify a particular storage device directly or indirectly. When the storage device is identified directly, the storage device identifier may identify the hardware of the storage device. When the storage device is identified indirectly, the identifier may identify a logical unit or volume that is implemented with the storage device. The storage device may include a solid-state drive, a non-volatile memory device, a volatile memory device, and/or any other suitable type of memory device. The address identifier may include either a logical or physical address that is associated with the storage device identifier.

The callback function 414 may include processor-executable instructions for completing the work request 342A. In some implementations, completing the request may include performing one or more operations that are associated with the work request, such as storing data in a storage device that is identified by the request data 412 or retrieving data from the storage device. In this regard, the processor-executable instructions may include instructions for placing commands to a device driver of the storage device, which would cause the work request 342 to be completed. Additionally or alternatively, the callback function 414 may include processor-executable instructions for decomposing the work request 342 into additional work requests. Stated succinctly, the present disclosure is not limited to any specific implementation of the callback function 414.

The state identifier 420 may include any suitable number, string, or alphanumerical string that identifies the current state of the thread 340. The thread framework 430 may include one or more processor-executable instructions for calling the callback function 414. Additionally or alternatively, in some implementations, the thread framework 430 may be configured to execute the process 600, which is discussed further below with respect to FIG. 6.

Figure 5:
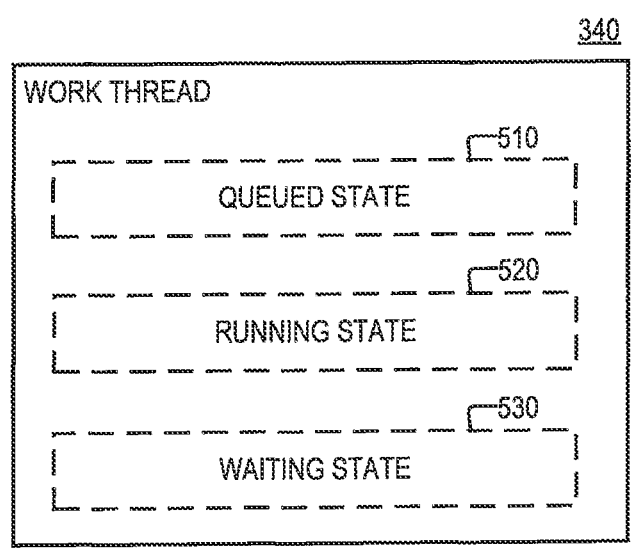
FIG. 5 is a diagram illustrating a plurality of possible states of the thread of FIG. 4, according to aspects of the disclosure.

FIG. 5 illustrates at least three possible states of the thread 340A. As illustrated, in some implementations, the thread 340A may be in a QUEUED state 510, a RUNNING state 520, and a WAITING state 530. In some implementations, the thread 340A may be in only one of the states 510, 520, and 530 at a time (i.e., the states 510, 520, and 530 may be mutually exclusive). When the thread 340 is in the QUEUED state 510, the thread 340A is ready to be scheduled for execution by the scheduler 210. For example, when the thread 340A is in the QUEUED state 510, the thread 340A may be identified in the READY queue 212 of the scheduler 210. However, legacy software may recognize the QUEUED state 510, as a state in which the thread 340 is present in a request queue, such as the work request queue 241. When the thread 340A is in the RUNNING state 520, the callback function 414 is executing. When the thread 340A is in the WAITING state 530, the thread 340A is suspended and waiting for one or more accesses of the storage device (identified by the request data 412) to complete. More particularly, when the thread 340A is in the WAITING state 530, the thread 340A may be removed from the READY queue 212 of the scheduler 210 and added to a waiting queue (not shown), where it would remain until the storage device accesses have completed.

Figure 6:
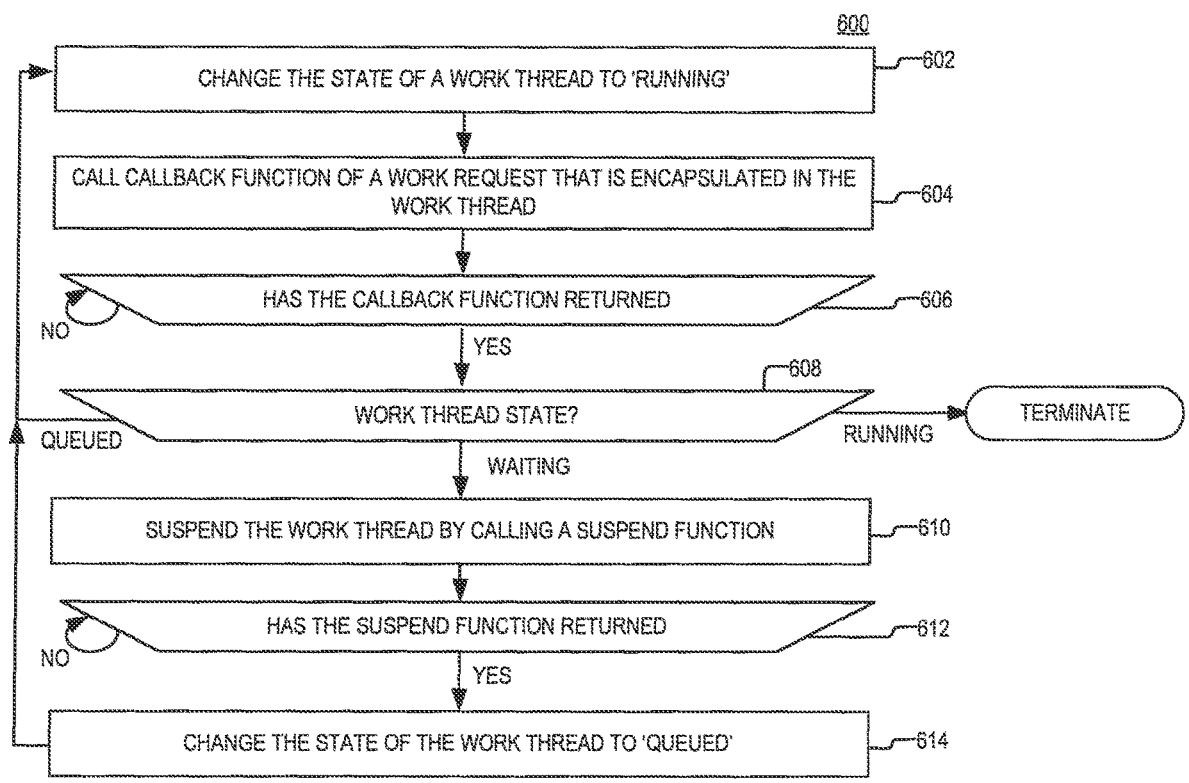
FIG. 6 is a flowchart of an example of a process, according to aspects of the disclosure.

FIG. 6 is a flowchart of an example of a process 600 for executing the thread 340A, according to aspects of the disclosure. In some implementations, the process 600 may be performed by the thread framework 430 of the thread 340A.

At step 602, the thread framework 430 transitions the thread 340A into the RUNNING state 520. In some implementations, transitioning the thread 340A may include changing the value of the state identifier 420 to indicate that the thread 340A is in the RUNNING state 520. At step 604, the thread framework 430 calls the callback function 414. At step 606, the thread framework 430 waits until the callback function 414 has returned. After the callback function 414 has returned, the process 600 proceeds to step 608.

At step 608, the thread framework 430 determines the state of the thread 340A after the callback function 414 has returned. After the callback function 414 has returned, the thread 340 may be in one of the WAITING state 530, the QUEUED state 510, and the RUNNING state 520. If the thread 340A is in the QUEUED state 510, the process 600 returns to step 602. If the thread 340A is in the WAITING state 530, the process 600 proceeds to step 610. If the thread 340A is in the RUNNING state 520, the thread 340A is terminated. According to the present example, the thread 340A remains in the running state, after the callback function 414 has returned following completion of the task associated with the work request 342A. The present disclosure is not limited to any specific method for determining and/or setting the state of the thread 340A. For example, if the callback function 414 wants to suspend the thread 340A, the callback function 411 may transition the thread 340A to the WAITING state 530 (e.g., by changing the value of state identifier 420), and then the callback function 414 may return. As another example, if the callback function 411 yields the processor and requeues itself (e.g., by calling the PUSH_TO_RUN_QUEUE function of API 350), the thread 340A may be transitioned into the QUEUED state 510 by the API 350 (e.g., see step 712 of process 700).

At step 610, the thread framework 430 suspends the thread 340A by calling a SUSPEND function. The SUSPEND function may be provided by an API (in the storage node 112) that is different from API 350. Calling the SUSPEND function may result in the thread 340A being removed from the READY queue 212 of the scheduler 210 and added to a waiting queue. Furthermore, in some implementations, when the SUSPEND function is called, the thread framework 430 may change the value of the state identifier 420 to indicate that the thread 340A is in the WAITING state 530. As discussed above, the thread 340A may remain in the waiting queue until one or more commands that are issued to a storage device are completed. After the commands completed, the thread 340A may be removed from the waiting queue and returned to the READY queue 212 of the scheduler 210. After the thread 340A is returned to the READY queue of the scheduler 210, the SUSPEND function may return. At step 612, the thread framework 430 waits until the suspend function returns. After the suspend function has returned, the process 600 proceeds to step 614.

At step 614, the thread framework 430 transitions the thread 340A into the QUEUED state 510. In some implementations, transitioning the thread 340A to the QUEUED state 510 may include changing the value of the state identifier 420 to indicate that the thread 340A is in the QUEUED state 510.

Figure 7:
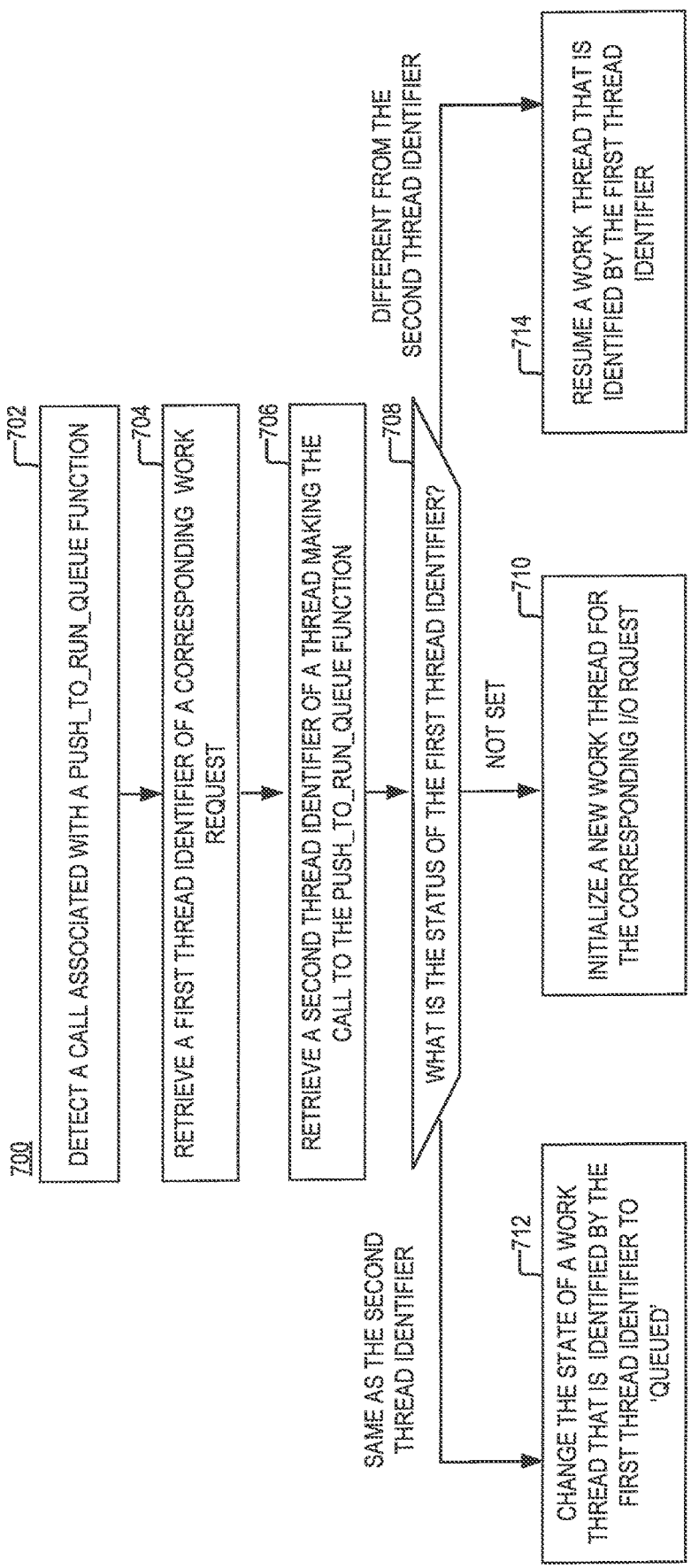
FIG. 7 is a flowchart of an example of a process, according to aspects of the disclosure.

FIG. 7 is a flowchart of a process 700, according to aspects of the disclosure. According to the present example, the process 700 is performed by API 350.

At step 702, API 350 detects a call to the PUSH_TO_RUN_QUEUE function of API 350. The call is associated with a corresponding work request 342, which may be referenced by one or more parameters of the call. At step 704, API 350 retrieves a first thread identifier of the corresponding work request 342. The first thread identifier may be the same as the thread identifier 411, which is discussed above with respect to FIG. 4. The first thread identifier may identify the thread 340 that is used to execute (or encapsulate) the corresponding work request 342 (if such thread has been designated yet). At step 706, API 350 retrieves a second thread identifier of the thread making the call to the PUSH_TO_RUN_QUEUE function.

At step 708, the status of the first thread identifier is determined. In some implementations, determining the status of the first thread identifier may include: (i) determining if the first thread identifier is not set (e.g., determining whether the thread identifier 411 is equal to NULL), and/or (ii) determining if the first thread identifier is the same as the second thread identifier. If the thread identifier is not set, the process 700 proceeds to step 710. If the thread identifier is the same as the second thread identifier, the process 700 proceeds to step 712. And if the first thread identifier is different from the second thread identifier, the process 700 proceeds to step 714.

At step 710, a thread 340 is initialized for the corresponding work request 342. At step 712, the thread 340 that is identified by the first thread identifier is transitioned into the QUEUED state 510. At step 714, the thread 340 that is identified by the first thread identifier is resumed by calling a RESUME function. The RESUME function may be provided by an API (in the storage node 112) that is different from API 350. Calling the RESUME function may result in the thread 340 being removed from a waiting queue and being added to the READY queue 212 of the scheduler 210.

The call to the PUSH_TO_RUN_QUEUE function, which is detected at step 702, can be made under different circumstances. In one scenario, the call may be made before the execution of the corresponding work request 342 has begun, when a thread desires to initiate the execution of the corresponding work request 342. When this is the case, no thread 340 would be allocated to the corresponding work request 342 and the first thread identifier of the corresponding work request would be equal to NULL. As noted above, when the first thread identifier is equal to NULL, API 350 may initialize a new thread 340 for the work request (at step 710). Initializing the thread 340 may include at least one of: (i) retrieving a thread 340 from a pool of available threads and adding the corresponding work request 342 to the retrieved thread, or (ii) instantiating a new thread 340 and adding the corresponding work request 342 to the instantiated thread.

In another scenario, the call to the PUSH_TO_RUN_QUEUE function may be made by the (code of the) corresponding work request 342 (e.g., code that is part of or executed by the callback function 414 of the corresponding work request 342), while the corresponding work request 342 is executing. When this is the case, the first thread identifier of the corresponding work request 342 would be the same as the second thread identifier (which is obtained at step 706). As noted above, when the first thread identifier is the same as the second thread identifier, API 350 would do nothing beyond changing the state of the thread to QUEUED. In some implementations, this scenario may occur when the corresponding work request 342 includes legacy code, which is configured to make a call to the PUSH_TO_RUN_FUNCTION (of API 250) when it wants to yield the CPU. In some implementations, the corresponding work request 342 may yield the CPU to avoid monopolizing the CPU and give a chance to other work requests to be executed. In some respects, when yielding the CPU, the legacy code may requeue itself by calling the PUSH_TO_RUN_QUEUE function, which is implemented by API 350 for the purpose of backward compatibility with API 250. In this scenario, any calls which were originally intended to be handled by API 250 may be handled by API 350 (so that the same legacy code can continue to be used).

In yet another scenario, the call to the PUSH_TO_RUN_QUEUE function can be made when an application thread 320 (or a secondary thread 330) wants to resume the execution of corresponding work request 342. When this is the case, the first thread identifier will differ from the second thread identifier. As noted above, when the first thread identifier is different from the second thread identifier, the thread 340, which has been allocated for the corresponding work request 342, may be resumed by calling a RESUME function.

At least some of the steps discussed with respect to FIGS. 1A-7 may be performed in parallel, in a different order, or altogether omitted. In some implementations, and depending on the context, the term work request may refer to an object or another programmatic representation of a command for storing or retrieving data from a storage device. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. Although the present disclosure is presented in the context of storage systems, the concepts and ideas disclosed therein can be applied in any suitable type of multi-tasking system. In this regard, it will be understood that the present disclosure is not limited to any specific implementation of the threads 340 and/or work requests 342.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
   initializing a first thread based on a first work request; and
   executing the first thread to complete the first work request,
   wherein the first thread is initialized and executed by using an Application Programming Interface (API) that is arranged to emulate a work request queue by initializing a different respective thread for each work request that is submitted to the API for addition to the work request queue,
   wherein executing the thread includes: receiving by the API, a request for adding the work request to the work request queue; detecting, by the API, whether the request for adding the work request to the work request queue is submitted by the first thread; when the request for adding the work request to the work request queue is not submitted by the first thread, calling, by the API, a resume function to add the first thread to a READY queue of a scheduler.

2. The method of claim 1, wherein the first work request is executed by using one or more poller threads, the one or more poller threads and the first thread being directly executed by a same scheduler.

3. The method of claim 1, wherein each of the respective threads that are initialized by the API is configured to execute only one work request.

4. The method claim 1, wherein initializing the first thread includes:
   receiving, by the API, a request for adding the work request to the work request queue;
   selecting the first thread from a pool of available threads; and
   adding the first thread to a READY queue of a scheduler.

5. The method of claim 1, further comprising:
   initializing a second thread based on a second work request; and executing the second thread to complete the second work request.

6. A method comprising:

initializing a first thread based on a first work request; and executing the first thread to complete the first work request, wherein the first thread is initialized and executed by using an Application Programming Interface (API) that is arranged to emulate a work request queue by initializing a different respective thread for each work request that is submitted to the API for addition to the work request queue, wherein the thread includes a framework portion, the framework portion being configured to execute a loop comprising the operations of: calling first function associated with the work request; detecting a state of the thread after the first function has returned; executing the first function again, when the thread is in a first state; suspending the thread when the thread is in a second state, the thread being suspended by calling a second function; and changing a status identifier associated with the thread to indicate that the thread is in the first state after the second function has returned.

7. A system, comprising:

a memory; and at least one processor operatively coupled to the memory, the at least one processor being configured to perform the operations of:

initializing a first thread based on a first work request; and executing the first thread to complete the first work request, wherein the first thread is initialized and executed by using an Application Programming Interface (API) that is arranged to emulate a work request queue by initializing a different respective thread for each work request that is submitted to the API for addition to the work request queue, wherein executing the thread includes: receiving by the API, a request for adding the work request to the work request queue, detecting, by the API, whether the request for adding the work request to the work request queue is submitted by the first thread; when the request for adding the work request to the work request queue is not submitted by the first thread, calling by the API, a resume function to add the first thread to a READY queue of a scheduler.

8. The system of claim 7, wherein the first work request is executed by using one or more poller threads, the one or more poller threads and the first thread being directly executed by a same scheduler.

9. The system of claim 7, wherein each of the respective threads that are initialized by the API is configured to execute only one work request.

10. The method claim 1, wherein initializing the first thread includes:

receiving, by the API, a request for adding the work request to the work request queue;

selecting the first thread from a pool of available threads; and adding the first thread to a READY queue of a scheduler.

11. The system of claim 7, wherein the at least one processor is further configured to perform the operations of:

initializing a second thread based on a second work request; and executing the second thread to complete the second work request.

12. A system, comprising:

a memory; and at least one processor operatively coupled to the memory, the at least one processor being configured to perform the operations of:

initializing a first thread based on a first work request, executing the first thread to complete the first work request, wherein the first thread is initialized and executed by using an Application Programming Interface (API) that is arranged to emulate a work request queue by initializing a different respective thread for each work request that is submitted to the API for addition to the work request queue, wherein the thread includes a framework portion, the framework portion being configured to execute a loop comprising the operations of: calling first function associated with the work request; detecting a state of the thread after the first function has returned; executing the first function again, when the thread is in a first state; suspending the thread when the thread is in a second state, the thread being suspended by calling a second function; and changing a status identifier associated with the thread to indicate that the thread is in the first state after the second function has returned.

* * * * *